United States Patent [19]

Sekiguchi et al.

[11] 4,222,575
[45] Sep. 16, 1980

[54] SHAFT SEAL DEVICE

[75] Inventors: Yoshikazu Sekiguchi, Kounosu; Kenji Asano, Ageo, both of Japan

[73] Assignee: Nippon Piston Ring Co., Ltd., Tokyo, Japan

[21] Appl. No.: 22,387

[22] Filed: Mar. 21, 1979

[30] Foreign Application Priority Data

Mar. 23, 1978 [JP] Japan .................. 53-36183[U]

[51] Int. Cl.³ .................. F16J 15/32; F16J 15/46
[52] U.S. Cl. .................. 277/59; 277/72 FM; 277/152
[58] Field of Search .......... 277/3, 27, 59, 72 R, 277/72 FM, 74, 75, 152, 165

[56] References Cited

U.S. PATENT DOCUMENTS

| 2,466,025 | 4/1949 | Hanson | 277/3 |
| 3,726,531 | 4/1973 | Pagan et al. | 277/59 |
| 3,825,270 | 7/1974 | Paramonoff et al. | 277/59 X |
| 3,847,453 | 11/1974 | Herbert | 277/59 X |
| 4,010,960 | 3/1977 | Martin | 277/3 |

FOREIGN PATENT DOCUMENTS 1389832 4/1975 United Kingdom ................ 277/59

Primary Examiner—Robert S. Ward, Jr.
Attorney, Agent, or Firm—Sughrue, Rothwell, Mion, Zinn and Macpeak

[57] ABSTRACT

A shaft sealing device using seal rings having a hook shaped portion defining an inner radial lip to engage and seal the shaft. The rings are positioned symmetrically with respect to a spacer to define a sealing liquid chamber between the shaft, the spacer and the lip portion. The spacer has liquid seal passages formed therein to introduce sealing liquid. The axial length of the lip portion is shorter than the axial hight of outer peripheral surface of the seal ring and the inner peripheral surface is tapered inwardly with respect to the axis of the shaft.

7 Claims, 4 Drawing Figures

SHAFT SEAL DEVICE

BACKGROUND OF THE INVENTION

This invention relates to a shaft seal device for sealing a reciprocating shaft. More particularly, it relates to a type thereof, wherein working fluid is substantially prevented from leakage at the sealing area in a Stirling cycle engine.

Stirling engines have received increasing attention in recent years because their smooth torque characteristics, clean exhaust gases, low noise, low fuel expense, low maintenance, and high durability when compared with a conventional gasoline engine. Furthermore, thermal efficiency of a Stirling engine is quite excellent since it's performance is similar to Carnot's cycle in comparison with that obtained by the internal combustion engine, and moreover, since fluid having relatively small molecular structure such as hydrogen or helium is used as the working fluid in a Stirling engine, excellent temperature efficiency of the thermal heat exchangers is obtained, and hydrodynamic loss can be reduced during operation.

However, engine materials may be deteriorated (become brittle) due to the employment of hydrogen, and more importantly, sealability comes into the biggest question. That is, since hydrogen or helium as the working fluid has a relatively small molecular structure, it is difficult to properly seal a Stirling engine. Stirling engines have accordingly exhibited high leakage rates in the seal area between the cylinder wall and the piston rod. Conventional "roll sox" seals have been reasonably effective for sealing but their durability is low due to fatigue caused by large repeated movement thereof, and due to the choice of flexible materials used therein.

In the sealing means of a Stirling engine, compact sealing means for use in a compact Stirling engine has been particularly requested. Recently, multiple seal rings have been used to form a compound seal with a block seal portion and a liquid seal portion positioned therebelow in order to enhance durability.

However, the problem of leakage of the sealing liquid used in the liquid seal portion has remained, and research to solve this problem has not defined a suitable mechanism therefor. Hence, the problem of leakage remains and effective engine design must take such leakage into consideration.

SUMMARY OF THE INVENTION

It is therefore an object of this invention to overcome the above-mentioned drawbacks and provide an improved sealing device wherein leakage of the working liquid is completely prevented and the leakage of the sealing liquid can be minimized.

Another object of this invention is to provide a sealing device within a compact and simple structure.

Briefly, and in accordance with this invention, a pair of seal rings each having a hook shape in cross section are tightly fixed in a casing in a symmetrical manner.

These and other object of this invention will become apparent from the description of the drawings and the preferred embodiment which follows.

DETAILED DESCRIPTION OF THIS INVENTION

Figure 1:
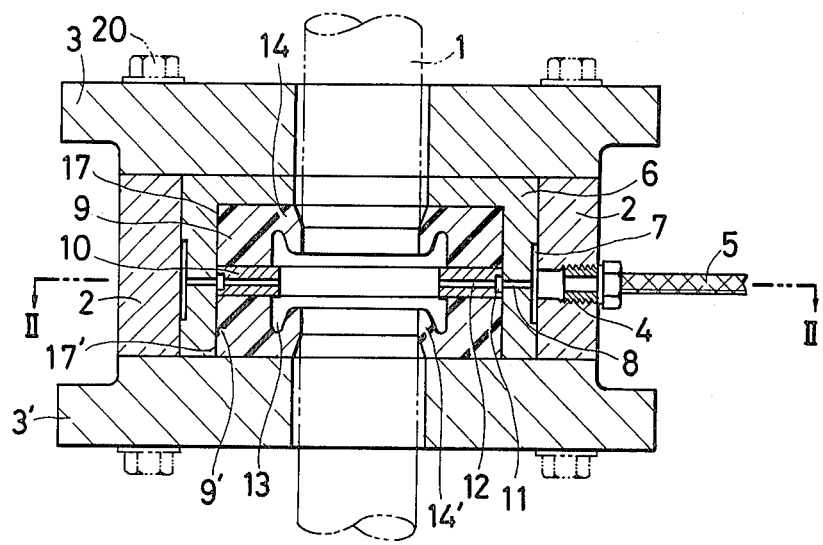
FIG. 1 is a cross-sectional view of a shaft sealing device according to this invention.
Figure 2:
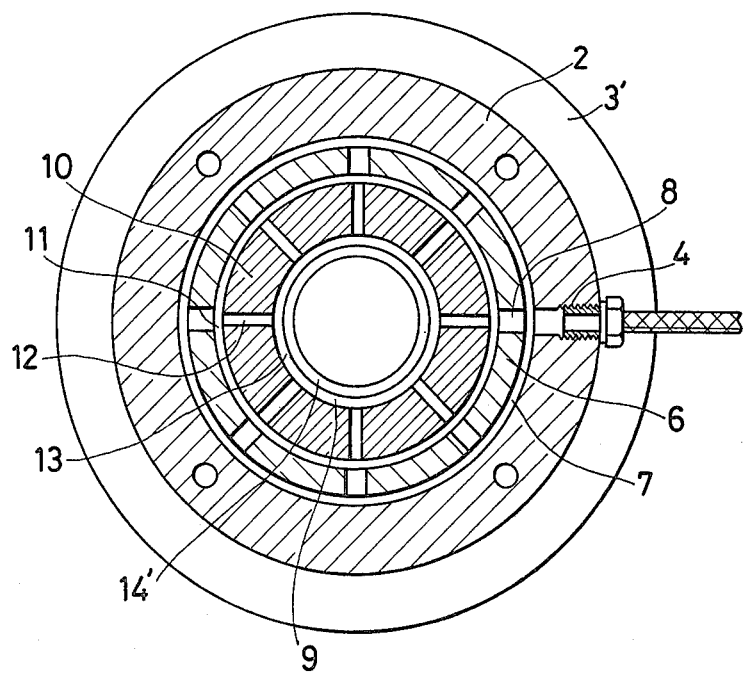
FIG. 2 is a cross-sectional view taken along the line II—II of FIG. 1.

Referring now to the drawings and initially to FIGS. 1 and 2, a shaft (piston) 1 (shown by a chain line) is slidably disposed in a shaft seal device. The shaft seal device provides upper and lower lid members 3, 3' and a cylindrical housing 2 fixedly interposed therebetween by bolts 20. The housing 2 is formed with a bore 4 connected to a pipe 5 for introducing a sealing liquid into a sealing liquid chamber 13 to be detailed later. Each of the lid members is formed with a central hole to insert the shaft 1 therethrough.

A cup shaped load casing 6 is disposed in a space defined between the lid members 3, 3' and the housing 2 to maintain tight surface contact therewith. The cup shaped casing 6 has a central hole to insert the shaft 1 therethrough and is formed with an annular recess 7 at the outer peripheral surface thereof at the position in alignment with the bore 4 to permit fluid communication therewith. Also, a plurality of passages 8 are radially formed at equal intervals in the casing 6. One end of each of the passages 8 is opened to the annular recesses 7.

In the interior space of the cup shaped casing 6, a pair of seal rings 9, 9' are disposed. The outer peripheral surface of each of the seal rings 9, 9' is in surface engagement with the inner peripheral surface of the cup shaped casing 6. One of the planner end surfaces of the one of the seal rings is in surface engagement with the inner surface of the cup bottom portion of the cup shaped casing 6, while one of the planner end surfaces of the other seal ring is in surface engagement with the lid member 3'. These seal rings are of equal shape with each other and each has a hook shape in cross section. These rings are symmetrically disposed with respect to an annular spacer 10 tightly interposed therebetween, to provide an annular space 13 which functions as a liquid seal chamber. The cup shaped casing 6 can be positioned reversely so as to allow surface engagement of the lower seal ring 9' with the cup bottom portion.

The spacer 10 is formed with an annular groove 11 at the outer peripheral surface thereof in an alighnment with the inner ends of the passages 8. Additionally, the space 10 is radially formed with a plurality of passages 12 at equal intervals. One end of each of the passages 12 is opened to the annular groove 11 and the other end thereof to the annular liquid seal chamber 13. Therefore, the sealing liquid supplied from the pipe 5 is introduced into the liquid seal chamber 13 and is filled therein through the bore 4, annular recess 7, passages 8, annular groove 11 and passages 12. The sealing liquid filled in the liquid seal chamber 13 provides uniform fluid pressure toward the lip to urge the same radially inwardly regardless of any movement of the shaft 1, and therefore local leakage from the lip can be prevented. Preferably fluid pressure in the liquid seal chamber 13 can be uniformly applied in a stabilized manner to the lip, by offsetting the passages 12 of the spacer 10 from the passages 8 of the casing 6.

Figure 3:
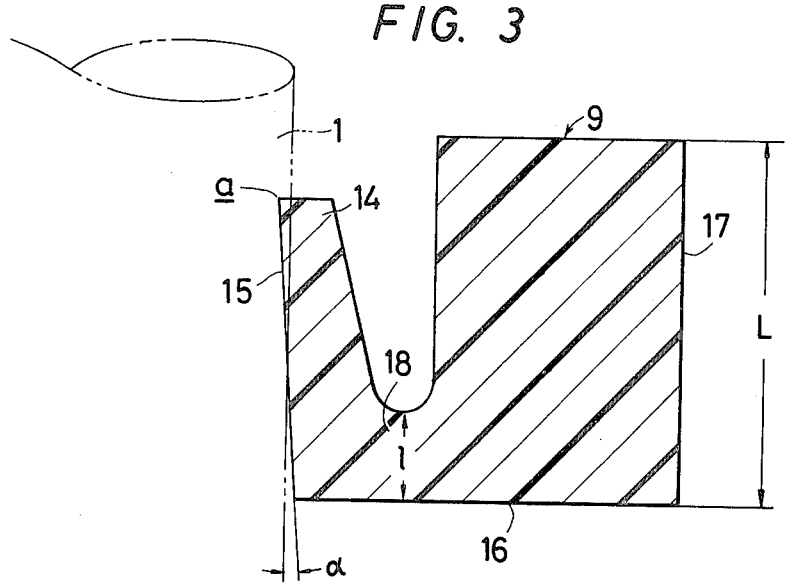
FIG. 3 is a schematic illustration showing a seal ring of this invention before assembly into the sealing device.

The seal rings 9, 9' are made of synthetic resin such as polytetrafluoroethylene or polyimide resin. As shown in FIG. 3, each inner peripheral surface 15 of the lip portion 14 of the seal rings 9, 9' is inclined at an angle α 3° to 5° with respect to a vertical line so as to have an inner diameter at the edge line a 0.6 to 1% smaller than the outer diameter of the shaft 1 during disassembly. Furthermore, vertical height of an outer peripheral surface 17 of the seal ring 9, 9' is larger than the vertical height of the lip portion 14. Hence, even if the seal ring is compressed along the axial direction thereof by the casing 6, the spacer 10 and the lid members 3, 3' the dimension of the lip portion 14 is maintained unchanged regardless of the compression of the outer peripheral surface portion 17. That is, the vertical height of the lip portion 14 is determined so that the tip end of the lip is prevented from being brought into contact with the spacer 10 even if axial compression is exerted on the seal ring. Furthermore, the root portion 18 of the lip portion 14 preferably has an axial thickness 1 $\frac{1}{4}$ to $\frac{1}{3}$ of the vertical height (axial length) (L) of the outer peripheral surface 17 in order to provide satisfactory mechanical strength and pressure response because of its resiliency.

If the thickness 1 of the root portion 18 is less than $\frac{1}{4}$ of the vertical height (L) of the outer peripheral portion 17, the lip will not provide sufficient mechanical strength, so that such lip may cause fluid to leak due to bending or deformation thereof. Conversely, if the thickness is more than $\frac{1}{3}$ thereof, the lip provides excessive rigidity to degrade pressure reaponse, and further, such excessive rigidity may cause the lip to vibrate to thereby inadvertantly allow leakage. If the inclination angle is greater than 5°, and if the percentage exceeds 1%, the contacting area between the shaft 1 and the seal rings becomes too small. As a result when large pressing forces are applied therebetween during assembly, the slidability of the shaft 1 with respect to the seal rings is degraded. If the inclination angle is less than 3° and the percentage is less than 0.6%, the contacting area between the shaft 1 and the seal rings becomes unduly large. This tends to reduce the suitable pressing urging force, resulting in degradation of sealability.

The seal rings 9, 9' are force-fitted with the casing 6, to provide zero-clearance therebetween to thereby avoid leakage of working fluid and sealing liquid, and radiate frictional heat generated by the relative movement between the shaft 1 and the seal rings toward the outside of the device.

Alternatively, the seal rings are fixedly secured to the casing 6 by contraction fitting, expansion fitting, adhesive materials or baking. Since the seal rings 9, 9' symmetrically confront with each other, sealability is maintained during both upward and downward movement of the shaft 1.

According to this invention, if the shaft 1 is inserted into the seal rings 9, 9', the lip portions 14, 14' are subject to tension to thereby pressingly contact the shaft 1. When the bolts 20 are fastened along the axial direction of the device, since the lip portions 14, 14' maintain their size, the actual sealing portions can maintain their sealability in contrast to the conventional V-shaped seal rings. Additionally, since the pressure of the sealing liquid filled in the sealing liquid chamber 13 is higher than that of the working fluid, lips 14, 14' are suitably urged toward the shaft 1 because of the pressure differential. Furthermore, the suitable tapered inner surface 15 of the lip 14, 14' and their resiliency can ensure smooth sliding movement of the shaft yet maintain sufficient seal of the working fluid. Moreover, since the lip 14, 14' are in pressing contact with the shaft 1 owing to their resiliency and the abovementioned pressure differential leakage of the sealing liquid along the shaft 1 from the sealing liquid chamber 13 due to sliding movement of the shaft 1 is minimized.

Figure 4:
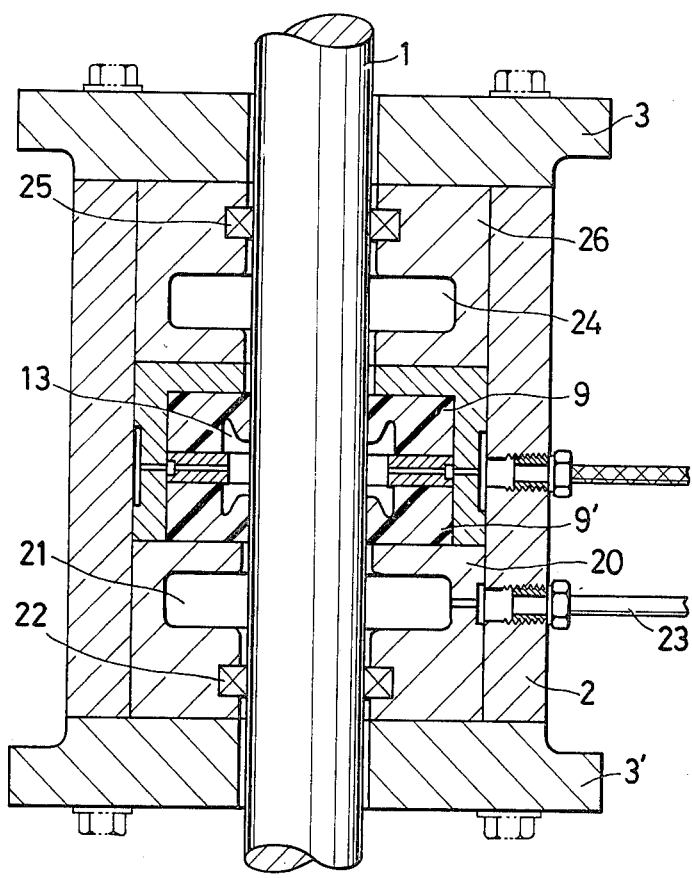
FIG. 4 is a cross-sectional view of a shaft sealing device incorporated into sealing blocks according to this invention.

FIG. 4 shows a shaft sealing device incorporated into sealing liquid blocks. Any sealing liquid accidentally leaking from the sealing liquid chamber 13 is accumulated in an annular groove 21 formed in a seal block 20 disposed below the seal rings 9, 9'. The seal block 20 is further provided with a packing 22 such as O ring to further prevent leakage of the sealing liquid. The groove 21 is connected to a return pipe 23 to recirculate the leaked sealing liquid into a sealing liquid reservior (not shown). Preferably, an auxiliary seal block 26 is provided above the seal rings (engine side) to accumulate leaked sealing liquid in a groove 24 formed therein. The block 26 further provides a packing 25 above the groove 24. The auxiliary seal block 26 can reduce the pressure of the working fluid applied to the sealing liquid chamber and therefore, leakage of the sealing liquid can be further decreased.

While the invention has been described in detail and with reference to specific embodiment thereof, it will be apparent to one skilled in the art that various changes and modifications can be made therein without departing from the spirit and scope thereof.

What is claimed is:

1. A shaft seal device comprising; a casing; a pair of seal rings; a spacer interposed between said seal rings, said seal rings and said spacer being fixedly secured in said casing; each of said seal rings having a hook shape cross section to provide a radially inner lip portion adapted to seal a shaft slidingly contacting therewith, the axial length of said lip portion being shorter than that of the outer peripheral surface of said seal ring, and a root portion of said lip portion having an axial thickness of $\frac{1}{4}$ to $\frac{1}{3}$ of an axial length of said outer peripheral surface of said seal ring, and the inner peripheral surface of said lip portion being tapered with respect to said shaft at an angle in the range of 3° to 5°; said rings being symmetrically positioned with respect to said spacer so as to confront said lip portion of one of said seal rings with said lip portion of the other seal ring to provide a sealing liquid chamber between said shaft, said spacer and said lip portions; liquid seal passages formed in said spacer to introduce sealing liquid into said sealing liquid chamber and to fill said chamber with said sealing liquid under pressure, whereby said sealing liquid filled in said sealing liquid chamber urges said lips radially inwardly to provide pressing contact of said lips with said shaft in combination with a resiliency of said lips.

2. The device of claim 1, wherein said casing is formed with an annular recess at an outer peripheral surface thereof and a plurality of holes radially arranged therein at equal intervals, each one end of said holes being opened to said annular recess, and wherein said spacer is formed with an annular groove at an outer peripheral surface thereof and said liquid seal passages radially arranged therein at equal intervals, said annular groove being communicated with each other end of said holes, and each one end of said passages being opened to said annular groove and each other end of said passages being opened to said liquid seal chamber.

3. The device of claim 1, wherein said casing is of cup shape and said seal rings are sealingly disposed in said casing with no clearance space between an internal surface of said casing and an external surface of said seal rings.

4. The device of claim 1, wherein said seal rings are identical to each other and are made of the same material, said seal rings are symmetrically disposed in said casing with each other.

5. The device of claim 1, further comprising a first seal block positioned at an axially outer side of said seal rings, said seal block being formed with a groove for accumulating said seal liquid leaking from said sealing liquid chamber, a return pipe connected to said groove for recirculating said sealing liquid into said sealing liquid chamber, and a packing associated with said seal block.

6. The device of claim 5, further comprising a second seal block positioned at an axially inner side of said seal rings, said second seal block being formed with a groove for accumulating said sealing liquid and said block having a packing.

7. The device of claim 1, wherein the inner diameter of said lip portion in an unassembled state is 0.6 to 1.0% smaller than the diameter of said shaft.

* * * * *